No. 805,704. PATENTED NOV. 28, 1905.
A. K. BALTEZOR.
TRACE ATTACHING MEMBER.
APPLICATION FILED MAY 24, 1905.

Witnesses
Geo. Ackman Jr.
F. S. Elmore

Inventor
A. K. Baltezor,
By Geo. S. Vashon
Attorney

UNITED STATES PATENT OFFICE.

ANDREW K. BALTEZOR, OF WENTZVILLE, MISSOURI.

TRACE-ATTACHING MEMBER.

No. 805,704.  Specification of Letters Patent.  Patented Nov. 28, 1905.

Application filed May 24, 1905. Serial No. 262,017.

*To all whom it may concern:*

Be it known that I, ANDREW K. BALTEZOR, a citizen of the United States, residing at Wentzville, in the county of St. Charles and State of Missouri, have invented certain new and useful Improvements in Trace-Attaching Members, of which the following is a specification.

This invention relates to trace-attaching members of the type known as "cockeyes," and has for its objects to produce a comparatively simple inexpensive device of this character which may be readily adapted to the various styles of swingletree-hooks now in general use and one whereby the trace will be positively maintained in position for presenting its flat side face toward the draft-animal, thus to obviate chafing of and consequent discomfort to the latter and undue wear upon the trace.

A further object of the invention is to provide a device of this character in which the cockeye may be readily adjusted for assuming a position in a plane at right angles to or one common with that of the trace-receiving head and one wherein the parts will be automatically locked relatively in their adjusted positions.

With these and other objects in view the invention comprises the novel features of construction and combination of parts more fully hereinafter described.

Figure 1:
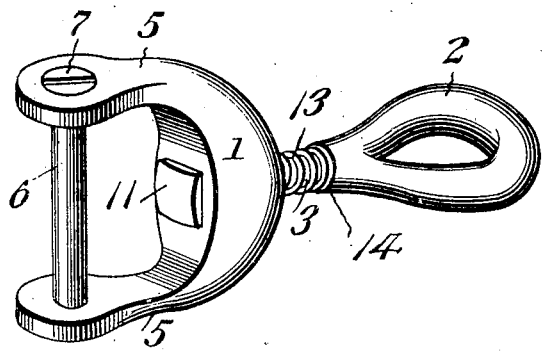
Figure 2:
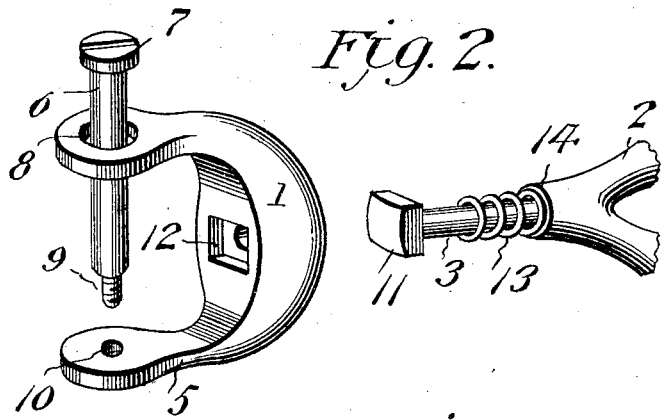
Figure 3:
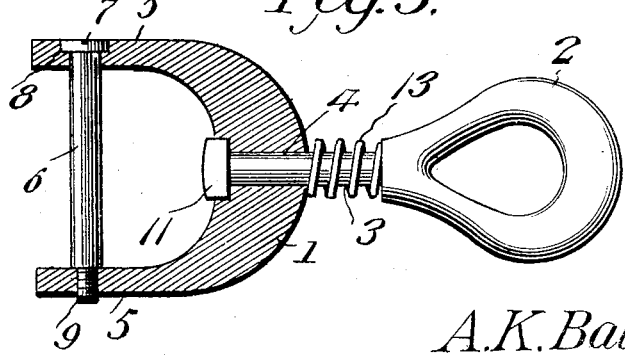

In the accompanying drawings, Figure 1 is a perspective view of a device embodying the invention. Fig. 2 is a similar view illustrating the parts of the device disconnected. Fig. 3 is a side elevation, partly in section, showing the cockeye in a different position from that disclosed in Fig. 1.

Referring to the drawings, it will be seen that the device as a whole comprises a trace-receiving member or head 1 and a cockeye 2, provided with a cylindrical shank or stem 3, extended through and journaled for rotation in a bearing-opening 4, formed in the rear portion of the member 1. The member or head 1 is preferably of substantially U shape, thus presenting a pair of spaced side portions or arms 5, connected at a point adjacent their outer ends by a removable trace-engaging member or key 6 in the form of a transversely-extending bolt having at one end a head 7, designed to seat in an opening 8 in one of the arms, and at its other end a reduced threaded portion or extension 9, adapted for entrance into an opening 10 in the other arm. It is to be understood in this connection that the key 6 is in practice entered through a transversely-disposed opening or loop provided at the end of the trace, whereby the latter and head 1 are maintained in fixed relation with their side faces disposed in a common plane.

The cockeye stem or shank 3 terminates at its inner or forward end in a square or other non-circular portion or head 11, designed to fit in a similarly-shaped socket or seat 12, formed in the member 1 at the inner end of the bearing-opening 4 and constituting, in effect, a continuation of the latter, there being arranged upon the shank a normally expanded spring 13, bearing at one end against the rear wall of the head 1 and at its other end against a shoulder 14, formed at the juncture of the shank 3 and cockeye 2, said spring serving to maintain the head 11 normally seated in the socket 12 for preventing relaive movement of the trace-receiving head and cockeye.

In practice when the parts are adjusted relatively to occupy the positions illustrated in Fig. 1 the device is adapted for use in connection with the class of swingletrees having downturned or vertically-disposed trace-engaging hooks, while with the parts positioned as in Fig. 3 the device is applicable to swingletrees equipped with horizontally-disposed hooks, it being apparent that in each instance the trace will be positively maintained in position for presenting its flat face toward the draft-animal. When it is desired to change the position of the cockeye relative to the member 1, the shank 3 is moved longitudinally inward against the action or tension of spring 13 until the head 11 is freed from its seat 12, whereupon the shank may be rotated in the opening 4 for attaining the desired purpose. After the proper adjustment of the parts has been effected the spring will act to automatically return the head 11 to its seat 12, thereby locking the parts against further relative movement, as will be apparent. It may be mentioned that owing to the flat face of the trace being presented toward the animal the latter is relieved from chafing and similar discomforts, while splitting and fraying of the edges of the trace, a serious objection consequent upon the use of other forms of cockeyes, is obviated and the life of the trace accordingly increased.

From the foregoing it is apparent that I produce a simple efficient form of device admirably adapted for the attainment of the ends in view, it being understood that minor changes in the details herein set forth may be resorted to without departing from the spirit of the invention.

Having thus described my invention, what I claim is—

1. A device of the class described comprising a head and a cockeye, said parts being connected for relative rotation for adjustment in a common plane or in planes at right angles to each other, and means for locking the parts relatively in their adjusted positions.

2. A device of the class described comprising a head and a cockeye, said parts being connected for relative rotation, and means for locking the parts relatively against movement.

3. A device of the class described comprising a head and a cockeye, said parts being connected for relative rotation, a non-circular head carried by one of the parts, and a socket provided in the other part to receive the head for fixing the parts against relative movement.

4. A device of the class described, comprising a trace-receiving member and a cockeye, one of said parts having a bearing-opening and a non-circular seat, a shank on the other parts rotatively disposed in said opening, a non-circular portion provided on the shank to enter said seat, and a spring for maintaining said portion in seated position.

In testimony whereof I affix my signature in presence of two witnesses.

ANDREW K. BALTEZOR.

Witnesses:
 ED. J. SCHIERBAUM,
 O. J. HOLTMAN.